United States Patent Office 3,679,361
Patented July 25, 1972

3,679,361
PROCESS FOR ALUM CRACKING AND THE
SO OBTAINED PRODUCTS
Giovanni Bonelli, Via Marchiondi 7, Milan, Italy
No Drawing. Filed Jan. 21, 1970, Ser. No. 4,765
Int. Cl. C01d 5/00; C01b 17/50; C01f 7/30
U.S. Cl. 23—121                                    18 Claims

ABSTRACT OF THE DISCLOSURE

A molten alum, is subjected to dehydration at a temperature of 95–300° C.—which can possibly be graduated in different percentages—and calcination, either in the same apparatus or in two different apparatuses, that is in a dehydrating and calcinating apparatus respectively; carrying out the operations preferably in a fluidized bed furnace and at a calcination temperature in a range of 575° C.–1200° C. Sulphur dioxide—from which sulphuric acid is successively prepared—alumina and alkali sulphates are obtained through the alum cracking thus effected.

---

This invention relates to a process that can be used on an industrial scale to crack or decompose alums, the process being advantageous from a technical and economical standpoint.

The invention also relates to the products obtained by such a process, particularly alumina, potassium sulphate or other alkali sulphate, and sulphuric acid of various concentrations.

The alums, as known, are double sulphates of aluminum and an alkali metal, within the molecule thereof containing a substantial proportion of water of crystallization.

Essentially, they are obtained from minerals widely spread in nature, such as leucite, alunite, nephelite, labradorite and the like, through attack by sulphuric acid, and are an important raw material for such products of substantial utility as aluminum, alkali sulphates, particularly potassium sulphate, sulphuric acid (and several derivatives thereof).

Therefore, the processing of these alums has often been a matter of study.

Particularly, the cracking thereof is a matter of high interest as allowing a sharp separation of alumina from the alkali sulphate: thus, while the component represented by aluminum sulphate decomposes in alumina and $SO_2$ at about 575–1200° C., the decomposition of alkali sulphate will occur only at a higher temperature; it is thus possible to thermally separate the alkali sulphate, and, on the other hand, its solubility allows a ready separation thereof by leaching from the insoluble cracking alumina. Further, the sulphur dioxide being recovered and converted to sulphuric acid serves for attacking further mineral in producing new alum.

It should be noted that on alum cracking an actual mixture of $SO_2$ and $SO_3$ develops, wherein $SO_2$ highly prevails, whereby in the course of the present disclosure this mixture will be conveniently referred to as "sulphur dioxide."

The attempts hitherto made in alum cracking, due to technical difficulties, could not be used industrially. Particularly, as it will be seen below, when alum melting, which is an essential preliminary step in thermal alum treatment, the presence of a substantial amount of water of crystallization leads to the formation of agglomerates, resuling in occluding the reaction furnaces, stopping the processing.

With a view to overcoming this drawback, wearisome studies have been therefore made, during which the novel process was worked out, this process decomposes alum in a simple and advantageous manner from both economical and technical standpoint, as will be more apparent below as the disclosure proceeds.

Therefore, the main object of the present invention is to provide a novel usually two-stage alum cracking process.

Another object of the present invention is to obtain pure alumina by said process.

A still further object of the present invention is to obtain alkali sulphates, particularly potassium sulphate, by said process.

A still further object of the present invention is to obtain sulphuric acid of various concentrations from the sulphur dioxide as recovered from alum processing.

From the following description, further objects, advantages and features of the present invention will be apparent to those skilled in the art.

The process according to the present invention essentially takes place in two stages: in the first stage, the pre-melted alum is dehydrated at 95–300° C. until it has a water content of 0% to 30%; in the second stage, it is calcinated in a fluidized bed furnace at about 575–1200° C. Thus, on one hand, a powder is obtained, comprising alkali sulphate and alumina, which are next separated, such as by grading, or flotation, or the like, and on the other hand, sulphur dioxide is obtained and recovered, after previous conversion to sulphuric acid, recycled to the mineral attack.

The heat required for pre-melting and dehydration of alum is supplied by recovery heat of the calcinating furnace.

As it will be understood, such several recoveries, either thermal or of $SO_2$, result in a reduction in the overall cost of the process and thus in a substantial economical advantage.

From a technical standpoint, it can be stated that, as far as the inventor's knowledge is concerned with, the process of the present invention is the only process for alum cracking which can effectively be practically carried out.

Preferably, the alum used as raw material is potassium alum, although it may be sodium alum or even a mixed sodium potassium alum, or various alums can be used, such as those deriving from the acid attack of nephelite or similar minerals, or even alums derived from other minerals.

The process may be a continuous or a batch process.

The degree of dehydration for the alum to be calcinated can differ according to the final type of sulphuric acid to be obtained as desired.

Thus, a water residue of about 9% in the dehydrated alum will provide in the next calcination stage for the recovery of sulphur dioxide and water at such ratios as to successively provide a monohydrate sulphuric acid which can be used for mineral attack in preparing the crystallized alum. Where oleum production is desired, alum should be calcinated to a water content less than 9%.

Then, as a principle, the degree of dehydration for the alum is not a limiting one, whereby the alum could be dehydrated also at a lower degree.

In a practical embodiment, the process of the present invention is essentially carried out as follows: the crystallized alum, as derived from acid attack of a suitable mineral, is previously melted in a proper melting unit, heated by the recovery heat of the calcinating furnace, in order to confer thereto the most suitable physical state for the next operations.

The alum, thus pre-melted, is then sprayed in the first processing stage preferably in a spray-dry tower which is maintained at 95–300° C. by recovery heat, as above mentioned. Thus pellets and powder are formed, which readily dehydrate, and on becoming of a lighter weight, are preferably continuously transferred to the second processing stage, preferably in a fluidized bed calcining furnace, which is maintained at a temperature in the range of 575–1200° C. by means of combustion gas or preheated air. Here, the thermal decomposition of alum occurs with development of sulphur dioxide which is recycled, as above mentioned, and alumina formation, while the alkali sulphate remains unaltered and found again in the final powders, mixed with alumina. The powder, thus obtained, is continuously or batch withdrawn and transferred, as such or after eventual previous grinding, to air classifiers (separators) to separate the two components by taking advantage of the specific gravity differential: in the case, this separation could be effected also by powder suspension in an inert liquid (flotation), or by leaching, according to known techniques.

In the case and when required, the separation methods above described could be also promiscuously employed.

Instead of using a separate spray-dry tower for alum dehydration, in the first stage of processing also other known dehydrating systems can be used, such as a fluid bed drier.

In particular, resort could be made also to a variant form of the above described process. Thus, it was observed that by adding the alum, as such or pre-melted, with a particular inert antiagglomeration additive prior to or during its introduction into the calcinating furnace, a successful prevention in mass agglomerating and occluding the apparatus is provided.

In this case, the dehydration and calcination need not be effected in a different apparatus, as the provision of said antiagglomerating additive prevents the mass from agglomerating and occluding the apparatus. Thus, the mixture of unmelted alum, as such or pre-melted, and antiagglomerating additive can be introduced into the furnace for calcination.

As antiagglomerating additive only a material is useful which will not contaminate the unfinished or finished products, particularly alumina; therefore, the antiagglomerating additive should be perfectly inert and readily separable from alumina and, preferably, forming part of the processing cycle.

Alumina is a preferred antiagglomerating additive. For example, also potassium sulphate could also be used.

The type of additive and proportions thereof will vary according to the alums to be processed and furnaces used in the processing. Thus, according to this variant form, calcination can be carried out in the most varied types of furnaces, such as rotary furnaces, shelf furnaces and fluidizing furnaces. In the latter case, particularly the introduction in advance into the furnace of the antiagglomerating additive will lead to work bed forming.

The alumina and alkali sulphate obtained by the process of the invention, as described, are particularly pure and provided with a very satisfactory yield, higher than 90%.

As above mentioned, the process is made economical also for the possibility of effecting substantial recoveries in heat and material ($SO_2$) and simplicity in the required overall apparatus.

In order to better understand the process according to the invention, hereinafter an illustrative example is given which, however, is not to be intended as a limiting case.

EXAMPLE I.—POTASSIUM ALUM CRACKING 1000 kg. of crystallized potassium alum, as derived from leucite by sulphuric acid attack, are melted within a melting unit at 100–150° C. and sprayed in a molten state in a spray-dry tower, within which a temperature is maintained up to 300° C.

This tower can be heated by the heat of the recovery gases of the calcinating furnace of the next stage. Alum continuously passes therethrough and takes the form of pellets and powder, which readily dehydrate. In this particular case, dehydration was extended and a residue water content in the alum of 9–10% was obtained, using the temperature of 250–300° C.

The dehydrated product automatically passes to a fluid bed furnace, having a corresponding specific capacity and maintained at a temperature of about 1100° C., wherein in the same work period cracking is carried out. Thus, about 300 kg. of product are produced comprising about one third alumina and two thirds potassium sulphate.

The sulphur anhydrides which can be recovered, calculated as $SO_2$, correspond to about 200 kg.

What is claimed is:

1. A process for decomposing an alkali metal-aluminum alum, comprising (a) dehydrating a molten alum by spraying or by means of a fluidized system at a temperature of 95–300° C. until a dehydrated alum is formed in the form of dry pellets and powder having a water content of 0% to 30%, then (b) calcinating the dehydrated alum in a fluidized bed zone at a temperature in the range of 575–1200° C. until the dehydrated alum is converted to sulfur dioxide and a powdered mixture of alkali metal sulphate and alumina.

2. The process of claim 1 in which an inert antiagglomerant is added to the dehydrated alum during its introduction into the calcinating zone.

3. The process of claim 1, in which an inert antiagglomerant is added to the molten alum prior to the dehydrating step.

4. A process according to claim 1, wherein the alum dehydration and the calcination are carried out in separate zones.

5. A process according to claim 1, wherein said process is of a batch type.

6. A process according to claim 1, wherein said process is of a continuous type.

7. A process according to claim 1, wherein dehydration is intermittently carried out and calcination is continuously carried out.

8. A process according to claim 1, wherein dehydration is carried out by spray-drying the molten alum.

9. A process according to claim 1, wherein dehydration is carried out in a fluidized bed.

10. A process according to claim 1, wherein dehydration is continued until the alum has a water content less than 9%.

11. A process according to claim 1, wherein dehydration is carried out until the alum has 9% water content.

12. A process according to claim 1, wherein dehydration is carried out to a water content higher than 9%.

13. A process according to claim 1, wherein the heat for dehydration is heat recovered from the calcination step.

14. A process according to claim 1, wherein the powdered solid cracking product is separated into its components, alumina and alkali metal sulphate.

15. The process of claim 14, in which said components are separated by air classifiers.

16. The process of claim 14, in which said components are separated by flotation in inert liquids.

17. The process of claim 14, in which said components are separated by leaching.

18. A process according to claim 1, wherein dehydration and calcination are carried out in a fluidized bed.

References Cited

UNITED STATES PATENTS

| | | | |
|---|---|---|---|
| 1,442,317 | 1/1923 | Whittier | 23—121 X |
| 1,913,470 | 6/1933 | Andersen | 23—121 X |
| 2,119,551 | 6/1938 | MacCarthy | 23—121 |
| 2,369,037 | 2/1945 | Gallo | 23—121 |
| 2,441,022 | 5/1948 | Kingsbury et al. | 23—118 |
| 2,561,055 | 7/1951 | Hood | 23—121 |
| 2,799,558 | 7/1957 | Smith et al. | 23—142 |
| 3,275,405 | 9/1966 | Clark | 23—142 |

FOREIGN PATENTS

| | | | |
|---|---|---|---|
| 583,808 | 9/1959 | Canada | 23—121 |

EDWARD STERN, Primary Examiner

U.S. Cl. X.R.

23—1 D, 1 F, 118, 142, 177

UNITED STATES PATENT OFFICE
CERTIFICATE OF CORRECTION

Patent No. 3,679,361     Dated July 25, 1972

Inventor(s) Giovanni Bonelli

It is certified that error appears in the above-identified patent and that said Letters Patent are hereby corrected as shown below:

In the heading, please insert

--Claims priority, applications Italy

11799A/69 and 12683A/69,

Filed January 21, 1969 and
February 10, 1969, respectively--

Signed and sealed this 9th day of January 1973.

(SEAL)
Attest:

EDWARD M. FLETCHER, JR.
Attesting Officer

ROBERT GOTTSCHALK
Commissioner of Patents